(12) United States Patent
Johnson et al.

(10) Patent No.: US 7,901,725 B2
(45) Date of Patent: Mar. 8, 2011

(54) PRODUCTION OF GLUTEN-FREE FOOD PRODUCTS USING TIMOTHY GRASS

(75) Inventors: Duane L. Johnson, Big Fork, MT (US);
Bettie C. Stanislao, Bozeman, MT (US);
David C. Sands, Bozeman, MT (US)

(73) Assignee: Montana State University, Bozeman, MT (US)

( * ) Notice: Subject to any disclaimer, the term of this patent is extended or adjusted under 35 U.S.C. 154(b) by 891 days.

(21) Appl. No.: 10/575,528

(22) PCT Filed: Oct. 12, 2004

(86) PCT No.: PCT/US2004/033410
§ 371 (c)(1),
(2), (4) Date: Apr. 2, 2007

(87) PCT Pub. No.: WO2005/034977
PCT Pub. Date: Apr. 21, 2005

(65) Prior Publication Data
US 2008/0044518 A1 Feb. 21, 2008

Related U.S. Application Data

(60) Provisional application No. 60/510,564, filed on Oct. 10, 2003.

(51) Int. Cl.
*A23L 1/30* (2006.01)
*A61K 36/899* (2006.01)

(52) U.S. Cl. ......... 426/622; 426/618; 426/422; 426/630; 426/636; 426/439; 426/446; 426/460; 426/458; 426/504

(58) Field of Classification Search .................. 426/622, 426/615, 618, 422, 630, 636, 439, 446, 450, 426/458, 504
See application file for complete search history.

(56) References Cited

U.S. PATENT DOCUMENTS 3,044,877 A * 7/1962 Lent .............................. 426/335
3,676,150 A * 7/1972 Glicksman et al. ............. 426/62

FOREIGN PATENT DOCUMENTS

WO WO 94/02113 A1 2/1994
WO WO 99/57299 A1 11/1999

OTHER PUBLICATIONS

Hagman, Bette, More from Gluten-Free Gourmet: Delicious Dining Without Wheat, 1993, Henry Holt and Company, L.L.C. pp. 17-24.*
Moulton, LeArta A., The Herb Walk Manual, 1993, LM Publications, p. 17.*
Water-Cure Journal, 1852, Fowlers and Wells Publishers, vol. 13-16, p. 133.*
Wescott, David, Primitive Technology II Ancestral Skills, 2001, Gibbs Smith, Publisher, p. 1964.*
Savvateeva et al., Derwent WPI abstract of RU 2130053 Cl, accession No. 2000-301640, 1 page (1999).
Vernier, "International Search Report," 3 pages, in PCT Application No. PCT/US2004/033410, European Patent Office, Rijswijk, The Netherlands (mailed Jan. 26, 2005).

* cited by examiner

*Primary Examiner* — Jennifer C McNeil
*Assistant Examiner* — Hong Mehta
(74) *Attorney, Agent, or Firm* — Cooley LLP

(57) ABSTRACT

The present invention discloses novel methods of using *Phleum* spp. seeds, especially Timothy grass (*P. pratense* L.) seeds, for making gluten-free food products and the food products produced using such methods.

16 Claims, No Drawings

PRODUCTION OF GLUTEN-FREE FOOD PRODUCTS USING TIMOTHY GRASS

CROSS-REFERENCE TO RELATED APPLICATIONS

The present application is a U.S. National Phase Application of International Application PCT/US2004/033410, filed Oct. 12, 2004, which claims the benefit of U.S. Provisional Patent Application 60/510,564, filed Oct. 10, 2003, each of which is herein incorporated by reference in its entirety for all purposes.

GOVERNMENT RIGHTS STATEMENT

This invention was made with government support under grant number 2003-34510-13449, awarded by USDA-CSREES. The government has certain rights in the invention.

FIELD OF THE INVENTION

This invention relates generally to the production of gluten-free food products. In particular, this invention is directed to a novel use of Timothy grass seed as a source of gluten-free flour.

BACKGROUND OF THE INVENTION

All referenced publications and patent applications herein are incorporated by reference to the same extent as if each individual publication or patent application was specifically and individually indicated to be incorporated by reference.

The following description includes information that may be useful in understanding the present invention. It is not an admission that any of the information provided herein is prior art or relevant to the presently claimed inventions, or that any publication specifically or implicitly referenced is prior art.

Gluten is a plant protein occurring in wheat, rye, barley, oats, and other related grains and is commonly found in all foods that contain these grains. Gluten is used as an adhesive and as a flour substitute. A large portion of the human population cannot tolerate gluten when it comes in contact with the small intestine. This condition is known as Celiac Disease (sometimes called non-tropical sprue or gluten sensitive enteropathy). Celiac Disease is a common genetic disease in Europe and is also extremely widespread in the United States. About 1 in 250 people in Italy, 1 in 300 people in Ireland and 1 in 133 Americans are afflicted with this disease (Fasano 2003; U.S. Pat. No. 6,709,686).

When people with Celiac Disease eat foods containing gluten, their immune system responds by damaging the small intestine. Specifically, tiny fingerlike protrusions, called villi, on the lining of the small intestine are lost. Normally, nutrients from food are absorbed into the bloodstream through these villi. Without villi, a person becomes malnourished—regardless of the quantity of the food eaten. Symptoms of Celiac Disease may include one or more of the following: recurring abdominal bloating and pain, chronic diarrhea, weight loss, pale foul-smelling stool, unexplained anemia, gas, bone pain, behavior changes, muscle cramps, fatigue, delayed growth, failure to thrive in infants, pain in the joints, seizures, tingling numbness in the legs resulting from nerve damage, pale sores inside the mouth known as aphthus ulcers, painful skin rash known as dermatitis, herpetiformis, tooth discoloration or loss of enamel, and missed menstrual periods (U.S. Pat. No. 6,709,686).

Current treatment is effected by a well-balanced gluten-gliadin-free diet high in calories and proteins and normal in fat. U.S. Pat. No. 4,958,418; WO 99/56698 and Japanese Patent No. 1156927 each teach other treatments for patients affected by Celiac Disease that are not responding to gluten-gliadin-free diets. Unfortunately the only truly effective treatment is to follow a gluten-free diet. This means eliminating virtually all foods made from these grains (e. g., food starch when it is prepared from wheat, and malt when it comes from barley). The gluten-free diet is a lifetime requirement. Individuals following such a diet have an incredibly difficult time eating at restaurants due to the presence of gluten in much of the food on the menus. As such, a need exists for new gluten-free products.

The seed of Timothy grass (*Phleum pratense* L) contains essentially no gluten. We have discovered that flour obtained from Timothy seed can be milled and baked in manner similar to wheat and can be used to manufacture gluten-free food products. The products of this invention can be used as nutraceuticals for the control of Celiac Disease in human beings.

SUMMARY OF THE INVENTION

The instant invention provides novel methods of using Timothy grass seed as a source of gluten-free flour to be used in a manner similar to wheat for the manufacture of food products, such as risen and flat bread products. Timothy flour contains essentially no gluten (as determined by a Celiac ELISA test) and can be milled and baked in a manner similar to wheat. The seed tastes sweet and with nutty undertones. The flour is similar to wheat flour in color and texture. For risen bread products a rising agent, such as baking soda or baking powder, is required. Leavened breads produced by yeast and flour can also be produced. Timothy can be blended with other starch sources such as potato flour, rice flour or tapioca in formulation. These products are used as nutraceuticals for the control of Celiac Disease in human beings.

The present invention provides food products for human consumption, wherein the food products comprise the whole seeds, seed parts, flour or starch obtained from *Phleum* spp. seeds. The invention also provides the food products produced by such methods, wherein the food products are gluten-free. Representative food products which can be produced using the methods of the present invention include but are not limited to pancakes, noodles, bread, muffins, buns, biscuits, cookies, pastries, cupcakes, doughnuts, pretzels, crackers, chips, cakes, stews, soups, dressings, beverages, stuffing, pizza dough, cereals, candies and snack foods. In one embodiment, the preferred *Phleum* spp. seeds used in such methods and for producing such food products are obtained from *Phleum pretense* L.

The present invention provides food products for human consumption, wherein the food products comprise flour obtained from *Phleum* spp. seeds. In one embodiment, such food products are gluten-free. Representative gluten-free food products that can be produced using the methods of the present invention include but are not limited to pancakes, noodles, bread, muffins, buns, biscuits, cookies, pastries, cupcakes, doughnuts, pretzels, crackers, chips, cakes, stews, soups, dressings, beverages, stuffing, pizza dough, cereals, candies and snack foods. In one embodiment, the preferred *Phleum* spp. seeds are obtained from *Phleum pretense* L.

This invention provides methods of producing gluten-free food products for human consumption, wherein the methods comprise obtaining the seed or grain of Timothy grass (*Phleum pretense* L.); producing flour, starch, malt or cereal-based products from the seed or grain; and using the flour, starch, malt or cereal-based products to produce gluten-free food products for human consumption.

This invention provides methods of producing food and beverage products for human consumption, wherein the methods comprise obtaining seed from Timothy grass (*Phleum pratense* L.); processing the seed into food-grade flour, starch, malt, and cereal-based products; and utilizing the flour, starch, malt and cereal-based products to produce food and beverage products, wherein the food and beverage products are essentially devoid of gluten.

This invention provides methods of making risen bread products, said methods comprising producing flour from the seeds of Timothy grass and producing risen bread products using the flour, wherein the risen bread products are essentially devoid of gluten. This invention also provides the risen bread products produced by such methods.

The present invention provides methods of making flatbread products, said methods comprising producing flour from the seeds of Timothy grass and producing risen bread products using the flour, wherein the flatbread products are essentially devoid of gluten. This invention also provides the flatbread products produced by such methods.

This invention provides methods of making extruded cereal products for human consumption, said methods comprising processing seeds obtained from seeds of Timothy grass and producing extruded cereal products using the processed seeds, wherein the extruded cereal products are essentially devoid of gluten. This invention also provides the extruded cereal products produced by such methods.

This invention provides methods of making malt extract for brewing, said methods comprising sprouting Timothy grass seeds and using the sprouted seeds to produce gluten-free malt extract for brewing, wherein the malt extract is essentially devoid of gluten. This invention also provides the malt extract produced by such methods. The present invention provides methods of making food products or beverage products, said methods comprising using the gluten-free, malt extract of the present invention to produce the food product or beverage product, wherein the food products or beverage products are essentially devoid of gluten.

The present invention provides methods of making food products, said methods comprising producing the food product using flour obtained from seeds of Timothy grass combined with gum, wherein the food product is essentially devoid of gluten. In one embodiment, the preferred gum used in such methods is xanthan gum or guar gum. Examples of such food products include, but not limited to, cakes, cookies, brownies and bread.

The present invention provides methods of making fermented breads or fermented bread products, said methods comprising producing flour from the seeds of Timothy grass and producing the fermented breads or fermented bread products using the flour, wherein the fermented breads or fermented bread products are essentially devoid of gluten. The present invention also provides the fermented breads or fermented bread products produced by such methods.

DETAILED DESCRIPTION OF THE INVENTION

I. Definitions

As used herein, "ELISA" refers to enzyme-linked immunosorbent assay that uses specific antibodies to detect antigens or antibodies. The antibody-containing complexes are visualized through an enzyme coupled to the antibody. Addition of substrate to the enzyme-antibody-antigen complex results in a colored product.

As used herein, the term "endosperm" refers to a triploid structure resulting from the development of a fusion between two polar nuclei of the embryo sac and one of the sperm nucleus from the pollen found in many plant seeds. The endosperm frequently stores food materials, which are broken down during germination.

As used herein, the term "extrusion" refers to a continuous process in which a preformed food product is cooked, shaped, and puffed by a combination of mechanical and thermal energy inputs.

As used herein, the term "flat bread" refers to any of various breads made from usually unleavened dough and baked in flat, often round loaves.

As used herein, the term "grain" refers to any small, dry, one-seeded fruit of a cereal grass, having the fruit and the seed walls united.

As used herein, the term "guar gum" refers to an edible thickening agent extracted from the seeds of the guar bean plant (*Cyamopsis tetragonoloba*). Guar gum, is also used by people who are allergic to gluten to add volume and viscosity to bread and other gluten-free baked goods.

As used herein, the term "seed" refers to a ripened plant ovule containing an embryo. For the purposes of this disclosure and claims, the terms "grain" and "seed" are used interchangeably throughout to refer to the grain and/or seed of Timothy grass.

As used herein, "gluten" refers to an amorphous ergastic protein found combined with starch in the endosperm of most cereals. It constitutes about 80% of the proteins contained in wheat and is composed of the proteins gliadine and glutenine. Gluten is responsible for the elasticity of kneaded dough which allows it to be leavened, as well as the 'chewiness' of baked products like bagels. Gluten is found in most cereals (e.g., wheat, rye and barley) and their end products. No gluten is contained in rice, soybean (soya), maize (corn), buckwheat, and sunflower seeds, for example.

As used herein, "gluten-free flour" refers to flour that does not contain the protein gluten.

As used herein, the term "leavened or risen bread" refers to bread made by the process of adding gas to a dough before baking to produce a lighter, more easily-chewed bread. Breads can be leavened by adding leavening agents including, but not limited to, yeast, bacteria, baking soda, baking powder, butter milk and steam.

As used herein, the term "maize" means any *Zea* species, including, but not limited to, *Z. mays, Z. diploperennis, Z. luxurians, Z. nicaraguensis* and *Z. perennis*. Thus, as used herein, the term "maize" means any type of corn including, but is not limited to, any cultivated maize, any wild maize, any maize species, any intra- and inter-species maize crosses, all maize varieties, all maize genotypes and all maize cultivars.

As used herein, the term "malt" refers to a grain soaked in water to soften it, induce germination to activate its enzymes and then dried. Examples of grain that can be malted include, but not limited to, barley, wheat and triticale.

As used herein, the term "milling" refers to a process in which grain is reduced to flour by a succession of crackings, or of slight and partial crushings, alternately with sifting and sorting the product.

As used herein, the term "nutraceutical" refers to a food or food component considered to provide medical or health benefits, including the prevention or treatment of disease.

As used herein, the term "rice" means any *Oryza* species, including, but not limited to, *O. sativa, O. glaberrima, O. perennis, O. nivara*, and *O. breviligulata*. Thus, as used herein, the term "rice" means any type of rice including, but is not limited to, any cultivated rice, any wild rice, any rice species, any intra- and inter-species rice crosses, all rice varieties, all rice genotypes and all rice cultivars.

*Phleum* L. species (*Phleum* spp.) refers to a genus of grasses, including *P. pratense, P. nodosum, P. bertolonii, P. alpinum, P. commutatum, P. phleoides, P. boehmeri* and *P. arenarium*.

As used herein, the terms "Timothy" or "Timothy grass" refer to *P. pratense* L., including, but is not limited to, any cultivated Timothy, any wild Timothy, any Timothy subspecies, any intra- and inter-species Timothy crosses, all Timothy varieties, all Timothy genotypes and all Timothy cultivars. Timothy is also called herd's grass, in England, cat's-tail grass, and meadow cat's-tail grass. It is much prized for fodder.

As used herein, the term "wheat" means any *Triticum* species, including, but not limited to, *T. aestivuin, T. monococcum, T. tauschii* and *T. turgidum*. Thus, as used herein, the term "wheat" means any type of wheat including, but is not limited to, any cultivated wheat, any wild wheat, any wheat species, any intra- and inter-species wheat crosses, all wheat varieties, all wheat genotypes and all wheat cultivars. Cultivated wheats include, but are not limited to, einkom, durum and common wheats.

As used herein, the term "xanthun gum" refers to a high molecular weight polysaccharide gum produced by a pure-culture fermentation of a carbohydrate with *Xanthomonas campestris*, purified by recovery with ethanol or isopropanol, dried and milled. It contains D-glucose and D-mannose as the dominant hexose units, along with D-glucuronic acid and pyruvic acid, and is prepared as the sodium, potassium or calcium salt; its solutions are neutral. Xanthan gum, a natural thickener, is used by people who are allergic to gluten to add volume and viscosity to bread and other gluten-free baked goods.

II. Grains

True grains are described as cereals (from Ceres, the Roman goddess of agriculture). They are small, single-seeded fruits belonging to the grass family—Gramineae. The most common grains consumed by humans are barley, maize (corn), millet, oats, rice, rye, sorghum, triticale and wheat. Seeds from some non-grass plants such as amaranth, buckwheat and quinoa are often grouped with cereals, but are not cereals.

Humans have used cereal grains as food since prehistoric times. The seeds of wild plants (the "ancestors" of cultivated wheat, barley and millet) were gathered during Palaeolithic and Neolithic times. The transition from gathering to cultivation started with the planting of these seeds. Millet, barley and wheat were the first cereals to be cultivated around 7000 BC. Rice was cultivated in South-East Asia in 3000 BC, and in China the five sacred cultivated plants were rice, barley, soybeans, wheat and millet. Maize was cultivated in Mexico around 5000 BC. Grains can be credited with starting agriculture which in turn had a significant impact on the development of human civilization.

Cereal grains have provided the world's most important source of energy for thousands of years. Grains contain a wide range of nutrients, including carbohydrate, dietary fibre, protein, unsaturated fat, vitamins and minerals, as well as non-nutrients, such as antioxidants and phytoestrogens. The nutrient content of grains is affected by many factors, including grain variety (genetic factors), growing location (agronomic conditions) and the season (environmental factors).

All true grains have the same basic structure. It has 3 parts—the bran, endosperm, and the germ. Bran is the hard, brownish outer protective skin of the grain (varies from 6% in corn to 16% of the grain in wheat). Bran layers include the cuticle, mesocarp, cross layer, tube cells and testa. The bran layers are a concentrated source of dietary fibre. Endosperm is the inner part of the grain (varies from 60% in rice, barley and oats to 80% of the grain in wheat). It stores proteins and carbohydrates and provides nourishment to the germinating embryo. Aleurone consists of one or more layers of cells between the bran and the endosperm (8-10% of total grain). The number of layers vary from 1 cell thick in wheat, rye, oats and maize to up to 3 cells thick in barley and rice. The aleurone layer is a concentrated source of vitamins, minerals and other nutrients. Germ is the part of the seed that becomes a new plant if the seed is sown (varies from 12% in maize and 10% in sorghum to as low as 2% or 3% in other grains). It consists of the embryo and the scutellum. It contains the most nutrition as a concentrated source of B vitamins, minerals, phytonutrients and vitamin E.

Grains are processed in different ways to make them suitable for consumption. The processing systems are generally based on the separation of the above described components of the grain. Some of the most commonly used processing systems are described below.

A. Flour Milling

Flour is a soft dry powder that is usually ground from grain. Wheat, rye and barley, and sometimes rice, are milled to produce flour. During flour milling the three parts of the grain are separated and recombined accordingly to achieve different types of flours. Most flour is milled by roller process in which seeds are alternately put through a series of high-speed steel rollers to crack open the grain and release the endosperm from the bran followed by series of grinding and sifting steps resulting in the production of flour.

B. Polishing

Grains are often polished by an abrasive process, where the grains are rubbed against each other and the special surface of the polishing machine to improve the appearance. Grains like rice and barley are often processed by polishing. In rice milling, the husk is removed to produce brown rice. Brown rice is covered with bran layer which densely wrap around each grain. Polishing machines use a rubbing technique to remove bran layer from each grain. This rubbing can be either by rough stone surface or using sharp metal blade rubbing/cutting each rice grain. Rubbed-out bran is removed by wind current, leaving milled rice. Barley grains are also milled in the same manner as rice to produce pearled barley grains.

C. Malting

Malting grains is necessary to develop enzymes which are required to modify the grain's starches into sugars. Barley is the most common malt due to its high enzyme content. Other grains may be malted, although the resulting malt may not have sufficient enzymatic content to fully and efficiently convert its own starch content. The process is basically divided into three stages. First stage involves steeping the barley in water until a designated moisture content has been reached. In the second stage barley is allowed to germinate under controlled conditions. Final stage involves kilning the germinated barley (green malt) to dry it and/or roast it.

D. Flaking

Flaking is a common grain processing method predominantly used in feedlots and in production ready to eat cereals for human consumption. There are different methods to process grains into flakes. Generally grains are softened by being partially cooked in steam, before flaking. They are then passed between large rolls which exert considerable pressure to compress the product into a thin 'flake'.

E. Kibbling or Cracking

Cracked or kibbled grains, usually rye and wheat are cracked and broken open by passing the grains through a steel-bladed mill. They are sometimes soaked and then added to bread dough to add texture and flavor.

F. Milling

Milling, fundamentally a separation process, takes two general forms: dry milling and wet milling.

Dry milling separates a grain kernel into its anatomical parts. It generally involves removing the bran (usually the pericarp, the seed coat and an outer layer or two of the endosperm) and the germ. Bran contains a significant percentage of insoluble cellulose, removing the bran increases the palatability of the remaining endosperm. Germ is removed because it has a high content of oil, which tends to become rancid quickly, thus shortening the shelf-life of products that contain the germ. In the milling process, the grains are cleaned and then water is added to increase the moisture content. The moisture allows the germ to toughen for easy removal. In the dry milling process, the germ is removed from the endosperm early. This prevents the oil from mixing with the products. Next, the coarsely ground material is sieved to completely remove any more of the germ and bran and then subjected to roller mills and particle size separation equipment. Than all parts are dried before storage.

In wet milling process, used exclusively for corn, the protein and starch are separated. The endosperm is broken down into starch and protein, while the bran and germ are processed into fiber and oil. The clean corn is soaked for 24-36 hours in warm water with sulfur dioxide added. The grain absorbs this sulfur dioxide and swells. Native enzymes begin breaking down the kernel. Next the softened grain is coarsely ground to free the germ from the endosperm. The germs are dried and pressed and the crude oil is extracted. The bran particles are separated from the endosperm. Finally, the gluten is filtered and dried. The starch is washed and vacuum filtered and dried. The starch and oil are the most valuable products from wet milling.

III. Uses of Grains

Grains are mostly used for human consumption, livestock feed, and as green plants for livestock pasture.

Wheat is one of the most important grains with unique proteins that form gluten. Flour from hard wheats contains a high percentage of gluten and is used to make bread and in the manufacture of pasta products like macaroni and spaghetti. White- and soft-wheat varieties are paler and have starchy kernels; their flour is preferred for cookies, cakes, pastries, flat breads, piecrust, biscuits, and breakfast foods. Wheat is used in the manufacture of whiskey and beer. It is also used in baby foods, and is a common thickener in soups, gravies, and sauces. Germ, bran, and malt are additional types of wheat products. Much of the wheat used for livestock and poultry feed is a byproduct of the flour milling industry. Industrial uses of wheat grain include starch for paste, alcohol, oil, and gluten.

Barley is mainly utilized for malt production, animal feed and human food. Malted barley is largely used in the brewing industry and sometimes as food malts for syrups, candy, malted milk concentrates, malt flour for wheat flour supplements, and specialty malts for coloring or flavoring of food products. Barley is also processed into pot or pearled barley for soups and dressings, flour for baby foods, flatbread and specialty foods.

Sorghum is primarily grown as a feed grain, often eaten as meal or in flat breads. It is also used for malted beverages and specialty foods such as popped grain and beer. Syrups with strong flavor and dark color are made from sweet sorghum.

The primary uses for corn (maize) are the production of corn sweeteners, cornstarch, as a feed for livestock, and the production of ethanol. Ethanol, a type of alcohol, is mostly used as an additive in gasoline to increase the octane rating. Corn is also eaten as vegetable. Some industrial uses of corn include filler for plastics, packing materials, insulating materials, adhesives, chemicals, explosives, paint, paste, abrasives, dyes, insecticides, pharmaceuticals, organic acids, solvents, rayon, antifreeze, soaps, and many more.

Rice stands apart from most grains because it is generally consumed in its kernel form, its properties are ideal components in the manufacturing of cereals, snack foods, baby foods, frozen dinners, sauce thickeners and other products.

Oats are mainly used for animal feed. Oats used for human consumption are primarily utilized as rolled oats and whole oat flour. The premier use of oats is in hot breakfast cereals, but other specialty applications include cold cereals, bakery products, granola bars, and baby foods.

Most triticale is still used for livestock feed although there is considerable interest in its use for human consumption.

Rye flour is used for bread making, as a filler in soups, sauces and sausage, and for flavor in certain pancake and waffle mixes. Other specialty foods such as hot breakfast cereals are also produced from rye. It is used as grain for livestock feed, and as a green plant for livestock pasture. It is also utilized for alcohol production, for beverages (mainly whiskey) and for industrial alcohol.

IV. Starch

Starch is one of the most important plant products and supplies an essential food energy source for the global human population. The main sources of starch are the cereal crops, rice, maize, wheat, and the root crop potatoes although in various parts of the world many other crops are used. Annual starch production from cereals is approximately 2050 million tonnes and from roots and tubers 679 million tonnes (Tester and Karkalas, 2002).

The two major components of starch are amylose and amylopectin. Natural starches are mixtures of amylose (10-20%) and amylopectin (80-90%). Amylose consists of long linear chains of α-1,4 linked glucose residues with relatively few α-1,6 linked branches whereas amylopectin is a highly branched molecule of shorter α-1,4 linked glucose molecules and more frequent α-1,6 branches (Banks and Muir, 1980). These two molecules are assembled together to form a semi-crystalline starch granule. The granule also contains small amounts of lipid and phosphate (Kainuma, 1988). The ratio of amylose to amylopectin varies, depending on the source of the starch, and is a major contributor to a starch's functional properties. Corn starch, for example, has around 24% amylose and 76% amylopectin, while potato starch has 20% amylose 80% amylopectin. Tapioca only has about 17% amylose and waxy maize or waxy brown rice have virtually none.

Starch is a major source of calories in grains and tubers, and foods made from them. It is the main thickener in gravies, sauces, and puddings. It absorbs water, and becomes a gel when cooked. As the starch swells up with water, the amylose leaches out, and the amylopectin forms the gel. Some starches have higher amylopectin content, and make better gels than those containing lots of amylose. Starch is an important energy source in baby foods. Modified waxy maize starch is important in processed meat products where its gelling properties are useful as a binder to maintain the texture and stability of the processed product.

Starch is also used in industry as adhesives, e.g. the glue, stabilizers, coatings, molecular sieves, binders. It is often used in drug tablets to bind the active component, allowing release in vivo once the starch component has been broken down by the body. It is used as a viscosity modifier in paints and coatings and for surface coating of papers. Starch also has uses in the textiles industry. In the oil industry starch is mixed with pumping water to assist in cooling down super-heated drilling bits.

V. Cereal-Based Products

Grains are widely used in the making of bread products, breakfast cereals, cereals bars, pastas (such as macaroni, spaghetti, noodles), crackers, muffins, tortillas, bagels, popcorn, tortilla chips, pancakes, waffles, biscuits, cookies, buns, rolls, scones, pastries, etc. Among the many cereal-based products, breakfast cereals still remain a popular cereal food product. Most of them are made from rice, wheat, corn, or oats. Some are also made from less familiar grains such as barley, amaranth, and quinoa. Breakfast cereals include cereal bars, cold cereals and hot cereals, such as oatmeal (made by processing oats), grits (made of coarsely ground corn), etc.

Whole grain or different parts of the grain can be used to make cereals. Basic methods used to make these cereals include flaked cereals, gun-puffed whole grains, extruded gun-puffed cereals, shredded whole grains, extruded and other shredded cereals, oven-puffed cereals, granola, and extruded expanded cereals. The cereals may also contain a number of ancillary ingredients such as vitamins and minerals for fortification, sugars, sweetener (such as sugar, corn syrup, molasses, or honey), salts, natural and artificial flavoring agents and other agents such as oils, coloring agents and natural and artificial preservatives. Many cereals also have added flavorings and ingredients such as nuts, fruits, and marshmallows.

A. Flaked Cereals

Flaked cereals are made directly from whole grain kernels or parts of kernels of corn, wheat, or rice and are processed in such a way as to obtain particles, called flaking grits, that form one flake each. The production of flaked cereals involves preprocessing, mixing, cooking, delumping, drying, cooling and tempering, flaking and toasting. In a typical flaking process, the chosen grain is cleaned; it is then milled to break the grain into smaller pieces, one-third to one-half the original size of the kernel. The pieces are mixed with other ingredients, such as vitamins, nutrients and sweeteners, then steamed under pressure for a number of hours. After being broken into bits again and partially dried, the pieces are flaked between steel rolls, then dried further and toasted to their final desired flavor and color.

B. Oven-Puffed Cereals

Oven-puffed cereals are made almost exclusively using whole-grain rice or corn, or mixtures of these two grains, because rice and corn inherently puff in the presence of high heat and the proper moisture content. The grains are mixed with sugar, salt, water, and malt and then pressure-cooked. After cooking, the grain is conveyed through a cooling and sizing operation. After cooling and sizing, the kernels are dried and tempered. The kernels are then passed through flaking rolls to flatten them slightly. The kernels are dried again and then oven-puffed, which requires a proper balance between kernel moisture content and oven temperature. After puffing, the cereal is cooled, fortified with vitamins (if necessary), and frequently treated with antioxidants to preserve freshness.

C. Extruded Flake Cereals

Extruded flakes differ from traditional flakes in that the grit for flaking is formed by extruding mixed ingredients through a die and cutting pellets of the dough into the desired size. The steps in extruded flake production are preprocessing, mixing, extruding, drying, cooling and tempering, flaking and toasting. The primary difference between extruded flake production and traditional flake production is that extruded flakes replace the cooking and delumping steps used in traditional flake production with an extruding step. The extruder is a long, barrel-like apparatus that performs several operations along its length. The first part of the barrel kneads or crushes the grain and mixes the ingredients together. The flavor solution may be added directly to the barrel of the extruder by means of a metering pump. Heat input to the barrel of the extruder near the feed point is kept low to allow the ingredients to mix properly before any cooking or gelatinization starts. Heat is applied to the center section of the extruder barrel to cook the ingredients. The die is located at the end of the last section, which is generally cooler than the rest of the barrel. The dough remains in a compact form as it extrudes through the die and a rotating knife slices it into properly sized pellets. The remaining steps for extruded flakes (drying, cooling, flaking, and toasting) are the same as for traditional flake production.

D. Gun-Puffed Whole Grain Cereals

Gun-puffed whole grains are formed by cooking the grains and then subjecting them to a sudden large pressure drop. As steam under pressure in the interior of the grain seeks to equilibrate with the surrounding lower-pressure atmosphere, it forces the grains to expand quickly or "puff." Rice and wheat are the only types of grain used in gun-puffed whole grain production, which involves pretreatment, puffing, screening, drying, and cooling. Wheat requires pretreating to prevent the bran from loosening from the grain in a ragged, haphazard manner, in which some of the bran adheres to the kernels and other parts to be blown partially off the kernels. One form of pretreatment is to add 4 percent, by weight, of a saturated brine solution (26 percent salt) to the wheat. Another form of pretreatment, called pearling, removes part of the bran altogether before puffing. The only pretreatment required for rice is normal milling to produce head rice. Puffing can be performed with manual single-shot guns, automatic single-shot, automatic multiple-shot guns, or continuous guns. In manual single-shot guns, grain is loaded into the opening of the gun and the lid is closed and sealed. As the gun begins to rotate, gas burners heat the sides of the gun body causing the moisture in the grain to convert to steam. When the lid is opened, the sudden change in pressure causes the grain to puff. Automatic single-shot guns operate on the same principle, except that steam is injected directly into the gun body. Multiple-shot guns have several barrels mounted on a slowly rotating wheel so that each barrel passes the load and fire positions at the correct time. The load, steam, and fire process for any one barrel is identical to that of the single-shot gun. After the grain is puffed, it is screened and dried before it is packaged. The final product is very porous and absorbs moisture rapidly and easily so it must be packaged in materials that possess good moisture barrier qualities.

E. Extruded Gun-Puffed Cereals

Extruded gun-puffed cereals use a meal or flour as the starting ingredient instead of whole grains. The dough cooks in the extruders and is then formed into the desired shape when extruded through a die. The extrusion process for gun-puffed cereals is similar to that for extruded flake production. After the dough is extruded, it is dried and tempered. It then undergoes the same puffing and final processing steps as described for whole grain gun-puffed cereals.

F. Oven-Puffed Cereals

Oven-puffed cereals are made almost exclusively using whole-grain rice or corn, or mixtures of these two grains, because rice and corn inherently puff in the presence of high heat and the proper moisture content. The grains are mixed with sugar, salt, water, and malt and then pressure-cooked. After cooking, the grain is conveyed through a cooling and sizing operation. After cooling and sizing, the kernels are dried and tempered. The kernels are then passed through flaking rolls to flatten them slightly. The kernels are dried again and then oven-puffed, which requires a proper balance between kernel moisture content and oven temperature. After puffing, the cereal is cooled, fortified with vitamins (if necessary), and frequently treated with antioxidants to preserve freshness. The final product is then packaged.

G. Whole-Grain Shredded Cereals

Wheat (white wheat) is primarily used to produce shredded whole grains. The steps involved in producing whole-grain shredded cereal are grain cleaning, cooking, cooling and tempering, shredding, biscuit formation and biscuit baking. Cooking is typically performed in batches with excess water at temperatures slightly below the boiling point at atmospheric pressure. Cooking vessels usually have horizontal baskets big enough to hold 50 bushels of raw wheat. Steam is injected directly into the water to heat the grain. After the cooking cycle is completed, the water is drained from the vessel and the cooked wheat is dumped and conveyed to cooling units, which surface-dry the wheat and reduce the temperature to ambient levels, thus stopping the cooking process. After the grain is cooled, it is placed in large holding bins and allowed to temper. The shredding process squeezes the wheat kernels between one roll with a smooth surface and another roll with a grooved surface. A comb is positioned against the grooved roll and the comb teeth pick the wheat shred from the groove. There are many variations in the grooved roll. After the shreds are produced, they fall in layers onto a conveyer moving under the rolls. After the web of many layers of shreds reaches the end of the shredder, it is fed through a cutting device to form the individual biscuits. The edges of the cutting device are dull, rather than sharp, so that the cutting action compresses the edges of the biscuit together to form a crimped joint, which holds the shreds together in biscuit form. After the individual biscuits are formed, they are baked in a band or continuous conveyor-belt oven. After the biscuits are baked and dried, they are ready for packaging.

H. Extruded Shredded Cereals

Extruded shredded cereals are made in much the same way as whole-grain shredded cereals except that extruded shredded cereals use a meal or flour as a raw material instead of whole grains. Raw grains include wheat, corn, rice, and oats, and, because the grains are used in flour form, they can be used alone or in mixtures. The steps involved in extruded shredded cereal production are grain preprocessing (including grain receiving, handling, and milling), mixing, extruding, cooling and tempering, shredding, biscuit formation, baking, drying, and packaging. The preprocessing, mixing, extruding, and cooling and tempering steps are the same as those discussed for other types of cereal. Shredding, biscuit formation, baking, drying, and packaging are the same as for whole-grain shredded cereal. Extruded shredded cereals are typically made into small, bite-size biscuits, instead of the larger biscuits of whole-grain shredded wheat.

I. Granola Cereals

Granola cereals are ready-to-eat cereals that are prepared by taking regular, old-fashioned whole-rolled oats or quick-cooking oats and mixing them with other ingredients, such as nut pieces, coconut, brown sugar, honey, malt extract, dried milk, dried fruits, water, cinnamon, nutmeg, and vegetable oil. This mixture is then spread in a uniform layer onto the band of a continuous dryer or oven. The toasted layer is then broken into chunks.

V. Timothy (*Phleum pratense* L.)

Timothy (*Phleum pratense* L.) is a perennial plant of the family Gramineae (grass family), commonly grown for cattle feed. Timothy was originally called "Herd grass" after Jonathan Herd who is thought to have first discovered it along the Piscataqua River near Portsmouth, N.H. about 1911 (Childers and Hanson 1985). The ultimate namesake for Timothy was Timothy Hanson, who promoted its use in Maryland, North Carolina, and Virginia. The name was first recorded in a letter from Benjamin Franklin to Jared Eliot in 1747 stating that the Herd grass he had received was "mere Timothy". It has been called Timothy ever since. Timothy became a major forage for the New England and Pennsylvanian colonies and was taken to England in 1763 for forage trials. Timothy appears to be native to northern Europe and probably crossed the Atlantic with the early settlers in hay litter or ballast from ships. The grass was so well accepted that in the early 1800s, it was considered to be the most important hay grass in America (Hoover et al. 1948; Childers and Hanson 1985). Production of Timothy declined rapidly between 1907 and 1971 as the number of horses and mules declined for the same period.

Timothy is a cool season grass and grows well in all soils. U.S. production is limited to wetter regions of the Northeast, upper Midwest and Pacific Northwestern U.S. It typically grows about three feet high and features non-branching spike-like panicles, or clusters of flowers. Each dense panicle is about 2 to 3 inches long, narrow and cylindrical in shape with rough texture. Each spikelet contains a single floret surrounded by a pair of glumes, pale green in color turning to tan. It has thin, smooth stems. All leaves are soft, narrow, light green and 2 to 6 inches long.

The stems of Timothy grass are erect, 20-100 (–130) cm high and generally grow in large tufts. Timothy's root system is shallow and fibrous. Up to 80% of the root mass has been found in the top 2 inches (5 cm) of soil. The vascular plants also tend to shed large amounts of pollen and primarily pollinate in the morning hours of late spring or early summer, depending on geographical location. The single seed is small and is enclosed in an awned, urn-shaped husk. Over 9,000 species of grass are currently in existence. The pollen of a small percentage of these species is known to cause allergic reactions in humans (McElroy et al. 2003; Moore et al. 2003).

Use of Timothy is restricted to forage hay and newer types for pasture and lawns. There is no record of Timothy seed being used as a human food or supplement Timothy grass seed is publicly available from a number of sources including but not limited to the following: (1) Peaceful Valley Farm Supply, P.O. Box 2209, Grass Valley, Calif. 95945 ('Timothy Grass'); (2) Mappleseed®, P.O. Box 1068, Lindsay, ON, K9V 5N4 and 4155 rue Lesage, St-Hyacinthe, QC J2T 5K1; ('Richmond', 'Climax') (3) Pickseed Canada Inc., Box 304, 1 Greenfield Rd., Lindsay, ON K9V 4S3 ('Richmond', 'TimPro', 'Comtal', 'Drummond'); (4) Seedland, Inc, 9895 Adams Road Wellborn, Fla. 32094; (5) Ampac Seed Company—32727 Hwy. 99E—PO Box 318 Tangent, Oreg. 97389; (6) Murray McMurray Hatchery, P.O. Box 458, 191 Closz Drive, Webster City, Iowa 50595 ('Western Timothy'); (7) University of Minnesota ('Itasca'); and (8) Kentucky American Seeds, Inc., 1104 Hopkinsville, Ky. 42241 ('Clair', 'Toro', 'Common', and 'Climax').

VI. Uses of Timothy Grass

Timothy is grown mainly for conserved feed, either as silage or hay, but may also be included in pasture mixtures.

Timothy is well suited to hay production, and is a palatable and nutritious forage for domestic livestock and big game animals. Growth is erect, easy to harvest and a full yield is normally possible in the first production year after seeding. It is grown either by itself or in a mixture with a legume, usually alfalfa, red clover, or birdsfoot trefoil.

When cut in full bloom, its high energy and low protein content were ideal for working stock. As with most grasses, it is low in forage value when harvested at a late stage of maturity. Timothy hay is highly valued as a desirable and palatable horse feed. It is an important forage for elk in Rocky Mountain National Park, Colorado and elsewhere, and is eaten by mule deer and mountain sheep.

Where adapted, Timothy is commonly used for pastures. As a pasture plant, it is relatively short-lived and stands are soon depleted unless provision is made for natural or artificial reseeding. It produces an open sod that is easily weakened if heavily grazed.

As mentioned above, there is no record of Timothy seed being used as a human food or supplement.

VII. Gluten

Gluten is a combination of proteins found in the endosperm of various grains, such as wheat, barley and rye, and other gluten-containing wheat variants, such as triticale, spelt and kamut. In wheat, gluten accounts for 90% of the protein and sakes up almost 15% of the total weight of a grain. It is thus an important source of protein (U.S. Pat. No. 6,692,933). Gluten is advantageous in making leavened products such as bread because it has an elastic, cohesive nature which permits it to retain carbon dioxide bubbles generated by leavening agents, and therefore to form a uniform air cell structure that defines the bread.

Gluten is comprised of two main groups of proteins: gliadins and glutenins. They tend to be rich in asparagine, glutamine, arginine or proline (Larkins, 1981; Spencer and Huggins, 1982) but very low in nutritionally important amino acids lysine, tryptophan and methionine.

Gliadin is a single-chained protein having an average molecular weight of about 30,000-40,000, with an isoelectric of pH 4.0-5.0. The gliadins comprise a multigene family and have been are divided into four groups, called alpha-, beta-, gamma-, and omega-gliadins, based on their electrophoretic mobility at low pH (Woychick et al., 1961). The amino acid compositions of the alpha-, beta-, and gamma-gliadins are similar to each other and to that of the whole gliadin fraction (Tatham et al., 1990a). The omega-gliadins contain little or no cysteine or methionine and only small amounts of basic amino acids. All gliadins are monomers with either no disulphide bonds (omega-gliadins) or intrachain disulphide bonds (alpha-, beta-, and gamma-gliadins). Gliadin proteins are extremely sticky when hydrated and have little or no resistance to extension. Gliadin is responsible for giving gluten dough its characteristic cohesiveness.

Glutenin is a larger, multi-chained protein with an average molecular weight of about 3,000,000 ranging from 100,000 to several million. The isoelectric pH of glutenin is about 6.5-7.0. Glutenin is resistant to extension and is responsible for the elasticity of gluten dough (U.S. Pat. No. 5,610,277).

EXAMPLES

Example 1

Taste Testing

Timothy seed was selected from the field and threshed by hand. The seed was then tasted for flavor. The seed had sweet flavor with nutty undertones.

Example 2

Milling

Timothy seed are small with thin, silvery, membranous lemma and palea surrounding a light brown caryopsis. The seed can be harvested and processed using different grain processing methods described above. The seed can be milled using a grain or a flour mill.

Example 3

Testing for Gluten

Timothy seed was tested for gluten content by enzyme-linked immunosorbent assay (ELISA) method. A sample of the Timothy seed was milled using a grain mill. The sample was then extracted using a 40% ethanol extraction solution and diluted. The diluted extract was added to microtitre wells coated with anti-gliadin antibody and incubated at room temperature. After washing away unbound serum components, anti-gliadin conjugated to horseradish peroxidase (HRP) antibody was added to the wells, which binds to surface-bound antibodies in the second incubation. Unbound conjugate was removed by washing, and a solution containing 3,3',5,5'-tetramethylbenzidine (TMB) and enzyme substrate was added to trace specific antibody binding.

Comparison of the level of color development obtained from the diluted extract, to that of a set of gliadin standards, allowed the gluten level in the original sample to be calculated. The sample contained one of the lowest gluten scores in the evaluation of standards and current starch sources currently in commercial use. Flour obtained from Timothy seed was also tested for gluten content using the Celiac Elisa test (Gluten home test kit by ELISA Technologies, Inc.). The test showed that Timothy flour contained essentially no gluten.

Timothy seed was also analyzed for protein content. Protein content of the seed was found to be in excess of 15%.

Example 4

Flour Production

Timothy has small, hard seeds that shatter easily when mature. These seeds are easily harvested with good standard, cultural procedures and cleaned to remove any coarse material, stones, and dust. A grain or flour mill was used to grind the seed to produce flour. Different kinds of mills and milling methods known in the art can be used to produced flour from Timothy seed.

Example 5

Baking

A sample of Timothy seed was milled using a grain mill to produce gluten-free flour. The flour was then baked as a muffin. The muffin was evaluated for starch and protein content according to standard procedures. The flour was found to be acceptable as a starch and protein replacement in gluten-free product manufacture.

Example 6

Making Bread

The Timothy flour produced according to Example 4 can also be used to bake bread. The following is one example of the ingredients and method, which could be used to produce such bread.

Ingredients:
3 Cups Timothy flour
½ Cup Warm Water (110° F.)
¼ Cup Sugar
4½ tsp. Yeast Granules
3½ tsp. Xanthan Gum or Guar Gum
¼ Cup Butter Flavored Shortening
⅔ Cup Dry milk powder
1 Cup Water
1½ tsp. Salt
1 tsp. Apple Cider Vinegar
2 tsp. Sugar
3 Eggs Method:
Combine Timothy flour, ¼ cup sugar, xanthan or guar gum, salt, dry milk in bowl of heavy mixer. In a small saucepan combine the 1 cup water and shortening. Warm just until shortening is melted. Dissolve 2 tsp. sugar in ½ cup warm water and mix in the yeast. Let proof until bubbly.

Turn mixer on low allowing all the dry ingredients to blend. Slowly add the warm water, shortening and vinegar. Blend thoroughly and then add in the eggs. Add the yeast mixture into bowl and beat on highest speed for two minutes. Cover mixing bowl with plastic wrap and a towel and put in warm place. Let the dough rise until doubled, approximately 1 to 1½ hours. Return bowl to mixer and beat on high for 3 minutes. Spoon the dough into greased loaf pan, level dough as best as you can, cover with plastic wrap and let rise until slightly above the top of the pan. Bake in preheated 400° F. oven for 10 minutes, At this point, place foil over the bread and bake 50 minutes longer. When baking is finished, remove loaf from bread pan and cool on wire rack.

Example 7

Food Products

The Timothy whole seeds, seed parts (e.g., seed bran), flour and/or starch obtained and used according to the present invention can be used in the production of any food product which is normally made using the whole seeds, seed parts, flour and/or starch obtained from plants normally used to produce such products for human consumption (e.g., wheat, barley, oat, rye, potato, yam, cassava, sorghum, soybean, rice, triticale, corn, etc.) Representative food products include but are not limited to pancakes, noodles, spaghetti, bread (flat bread, loaf bread, etc.), muffins, buns, biscuits, cookies, pastries, cupcakes, doughnuts, pretzels (soft and hard), crackers, chips, cakes, stews, soups, dressings, beverages (e.g., soft drinks, fruit juices, etc.), stuffing, pizza dough, cereals (hot and cold), candies and snack foods. Methods of producing such food products are well known to those skilled in the art of food processing, production and manufacturing.

Although the present invention has been described in detail with reference to examples above, it is understood that various modifications can be made without departing from the spirit of the invention. Accordingly, the invention is limited only by the following claims. All cited patents, patent applications and publications referred to in this application are herein incorporated by reference in their entirety.

REFERENCES

Alessio Fasano, M D, et al. (2003). Arch Intern Med.; 163: 286-292.
Banks W, Muir D D. (1980). Structure and chemistry of the starch granule. In: Preiss J, ed. *The biochemistry of plants*, Vol. 3. New York: Academic Press, 321-369.
Childers, W. R and A. A. Hanson. (1985). Timothy, In: R. F. Barnes, D. S. Metcalfe, and M. E. Heath (eds.). Forages: the science of grassland agriculture. Iowa State Univ. Press, Ames, 217-223.
Fasano A, et al. (2003). Prevalence of Celiac Disease in At-Risk and Not-at-Risk Groups in the United States; a Large Multi-Center Study. Archives of Internal Medicine. 163:286-292.
Hoover, M. M., M. A. Hein, W. A. Dayton, and C. O. Erlanson. (1948). The main grasses for farm and home, p. 639-700. In: A. Stefferud (ed.). Grass: the yearbook of agriculture. U.S. Government Printing Office. Washington, D.C.
Kainuma K. (1988). Structure and chemistry of the starch granule. In: Preiss J, ed. *The biochemistry of plants*, Vol. 14. New York: Academic Press, 141-180.
Larkins, B. A. (1981). Seed storage proteins: characterization and biosynthesis. In "The Biochemistry of Plants". Ed. P. K. Stumpf and E. E. Conn. 6: 449-89. New York: Academic.
McElroy, A. R. and H. T. Kunelius. (2003). Forages: Volume 1. An Introduction to Grassland Agriculture, 5th Ed.: Timothy. Iowa State Univ. Press. Ames, Iowa. 13:305-311.
Moore, K. J. (2003). Forages: An Introduction to Grassland Agriculture. Vol. 1. 6th Ed.: Compendium of Common Forages. Iowa State Univ. Press. Ames, Iowa. 556 pp.
Spencer, D. and Higgins, T. J. V. (1982). Seed maturation and deposition of storage proteins. In: "The Molecular Biology of Plant Development". (Ed. H. Smith and D. Grierson). Oxford: Blackwell.
Tatham, A. S. Masson, P. and Popineau, Y. (1990b). Conformational studies of peptides derived from the enzymatic hydrolysis of a gamma-type gliadin. *J. Cereal Sci.* 11; 1-13.
Tester R F, Karkalas J. (2001). The effects of environmental conditions on the structural features and physico-chemical properties of starches. *Starch* 53, 513-519.
Woychick, J. H., Boundy, J. A. and Dimler, R. J. (1961). Starch gel electrophoresis of wheat gluten proteins with concentrated urea. *Arch. Biochem. Biophys.* 94; 477-482.

We claim:

1. A food product for human consumption, wherein the food product comprises flour obtained from *Phleum* spp. seeds.

2. The food product of claim 1, wherein the food product is gluten-free.

3. The food product of claim 1, wherein the food product is selected from the group consisting of pancakes, noodles, bread, muffins, buns, biscuits, cookies, pastries, cupcakes, doughnuts, pretzels, crackers, chips, cakes, stews, soups, dressings, beverages, stuffing, pizza dough, cereals, candies and snack foods.

4. The food product of claim 3, wherein the seeds are obtained from *Phleum pratense* L.

5. A method of producing food and beverage products for human consumption, wherein the method comprises obtaining seed from *Phleum* spp.; processing the seed into food-grade flour; and utilizing the flour to produce food and beverage products.

6. The method of claim 5, wherein the food and beverage products are essentially devoid of gluten.

7. A method of making risen bread products, said method comprising producing flour from the seeds of *Phleum* spp. and producing risen bread products using the flour, wherein the risen bread products are essentially devoid of gluten.

8. The risen bread products produced by the method of claim 7.

9. A method of making flatbread products, said method comprising producing flour from the seeds of *Phleum* spp. and producing risen bread products using the flour, wherein the flatbread products are essentially devoid of gluten.

10. The flatbread products produced by the method of claim 9.

11. A method of making a food product, said method comprising producing the food product using flour obtained from seeds of *Phleum* spp. combined with gum, wherein the food product is essentially devoid of gluten.

12. The food product produced by the method of claim 11.

13. The food product of claim 12, wherein the gum is a xanthan or guar gum.

14. A method of making fermented breads or fermented bread products, said method comprising producing flour from the seeds of *Phleum* spp. and producing the fermented breads or fermented bread products using the flour, wherein the fermented breads or fermented bread products are essentially devoid of gluten.

15. The fermented breads or fermented bread products produced by the method of claim 14.

16. The method of claim 5, 7, 9, 11 or 14, wherein the *Phleum* spp. is *Phleum pratense* L.

* * * * *